(12) United States Patent
Ishihara et al.

(10) Patent No.: US 12,422,611 B2
(45) Date of Patent: Sep. 23, 2025

(54) OPTICAL MEMBER

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Kazuyuki Ishihara, Nisshin (JP); Masatoshi Tsuji, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 374 days.

(21) Appl. No.: 18/190,313

(22) Filed: Mar. 27, 2023

(65) Prior Publication Data

US 2023/0341616 A1   Oct. 26, 2023

(30) Foreign Application Priority Data

Apr. 20, 2022   (JP) ................... 2022-069608

(51) Int. Cl.
  *B60R 1/10*   (2006.01)
  *B60R 1/08*   (2006.01)
  (Continued)

(52) U.S. Cl.
  CPC ............ *G02B 6/0088* (2013.01); *B60R 1/08* (2013.01); *B60R 1/081* (2013.01); *B60R 1/10* (2013.01);
  (Continued)

(58) Field of Classification Search
  CPC .. B60R 1/08; B60R 1/081; B60R 1/10; G02B 6/0088; G02B 6/0016; G02B 6/0055; G02B 5/045; G02B 5/12
  (Continued)

(56) References Cited

U.S. PATENT DOCUMENTS 4,085,322 A * 4/1978 Sick ................... G01B 11/30
                                              250/559.08
5,719,649 A * 2/1998 Shono ................. G02B 6/0036
                                              362/617
(Continued)

FOREIGN PATENT DOCUMENTS

JP    6349987 B2 *  7/2018  ............. B60R 1/082
JP    6372305 B2    8/2018
(Continued)

OTHER PUBLICATIONS

U.S. Appl. No. 18/190,237, filed Mar. 27, 2023, Ando et al.
U.S. Appl. No. 17/950,347, filed Sep. 22, 2022, Tsuji et al.

*Primary Examiner* — Tarifur R Chowdhury
(74) *Attorney, Agent, or Firm* — Posz Law Group, PLC

(57) ABSTRACT

An optical member includes a light guide body and a light shielding member. The light guide body includes an incident surface on which a light from a blind area is incident, a first reflecting surface configured to reflect the light from the incident surface, a second reflecting surface configured to reflect the light reflected by the first reflecting surface, prisms protruding from the first reflecting surface in a normal direction of the first reflecting surface, and a protruding portion protruding from the first reflecting surface in the normal direction. The light shielding member is in contact with the protruding portion to provide a space between the light shielding member and the first reflecting
(Continued)

surface and covers the first reflecting surface to block a light incident toward the first reflecting surface from an outside of the light guide body.

7 Claims, 14 Drawing Sheets

(51) Int. Cl.
*F21V 8/00* (2006.01)
*G02B 5/12* (2006.01)
(52) U.S. Cl.
CPC ............. *G02B 5/12* (2013.01); *G02B 6/0016* (2013.01); *G02B 6/0055* (2013.01)
(58) Field of Classification Search
USPC ........ 359/851, 861, 862, 896, 627, 638, 836
See application file for complete search history.

(56) References Cited

U.S. PATENT DOCUMENTS

| | | | | |
|---|---|---|---|---|
| 5,835,276 | A * | 11/1998 | Asai | G02B 27/0018 359/638 |
| 8,087,811 | B2 * | 1/2012 | Pakhchyan | G02B 6/0033 362/617 |
| 11,754,848 | B2 * | 9/2023 | Zieba | G02B 27/0977 359/627 |
| 11,774,650 | B2 * | 10/2023 | Tashiro | B42D 25/328 359/567 |
| 2009/0086509 | A1 * | 4/2009 | Omori | G02B 6/0061 362/628 |
| 2014/0376258 | A1 * | 12/2014 | Wu | G02B 6/0055 362/617 |
| 2015/0092441 | A1 * | 4/2015 | Takagi | G02B 6/0038 362/613 |
| 2016/0187632 | A1 * | 6/2016 | Deguenther | G03F 7/70175 359/861 |
| 2017/0343781 | A1 * | 11/2017 | Kachelries | H02S 20/23 |
| 2019/0129086 | A1 * | 5/2019 | Chang | G02B 6/0036 |
| 2019/0369319 | A1 * | 12/2019 | Oki | G02B 6/0063 |
| 2023/0058463 | A1 | 2/2023 | Ando et al. | |
| 2023/0128607 | A1 * | 4/2023 | Ishihara | B60R 1/081 359/862 |
| 2023/0221570 | A1 * | 7/2023 | Borisov | G02B 27/0172 359/638 |
| 2023/0280539 | A1 * | 9/2023 | Tsuji | G02B 6/34 385/36 |

FOREIGN PATENT DOCUMENTS

| | | | | |
|---|---|---|---|---|
| WO | WO-2009079633 | A1 * | 6/2009 | ......... G02B 26/0841 |
| WO | WO-2014130860 | A1 * | 8/2014 | ............ G02B 27/26 |
| WO | WO-2017221914 | A1 * | 12/2017 | ............... B60R 1/10 |
| WO | WO-2018168081 | A1 * | 9/2018 | ......... G02B 27/0018 |
| WO | WO-2019220870 | A1 * | 11/2019 | |

* cited by examiner

OPTICAL MEMBER

CROSS REFERENCE TO RELATED APPLICATION

The present application claims the benefit of priority from Japanese Patent Application No. 2022-069608 filed on Apr. 20, 2022. The entire disclosure of the above application is incorporated herein by reference.

TECHNICAL FIELD

The present disclosure relates to an optical member.

BACKGROUND

Conventionally, there has been known a blind area assisting device that includes a semi-transmissive mirror, a mirror, a light guide body, and a prism.

SUMMARY

The present disclosure provides an optical member including a light guide body and a light shielding member. The light guide body includes an incident surface on which a light from a blind area is incident, a first reflecting surface configured to reflect the light from the incident surface, a second reflecting surface configured to reflect the light reflected by the first reflecting surface, prisms protruding from the first reflecting surface in a normal direction of the first reflecting surface, and a protruding portion protruding from the first reflecting surface in the normal direction. The light shielding member is in contact with the protruding portion to provide a space between the light shielding member and the first reflecting surface and covers the first reflecting surface to block a light incident toward the first reflecting surface from an outside of the light guide body.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
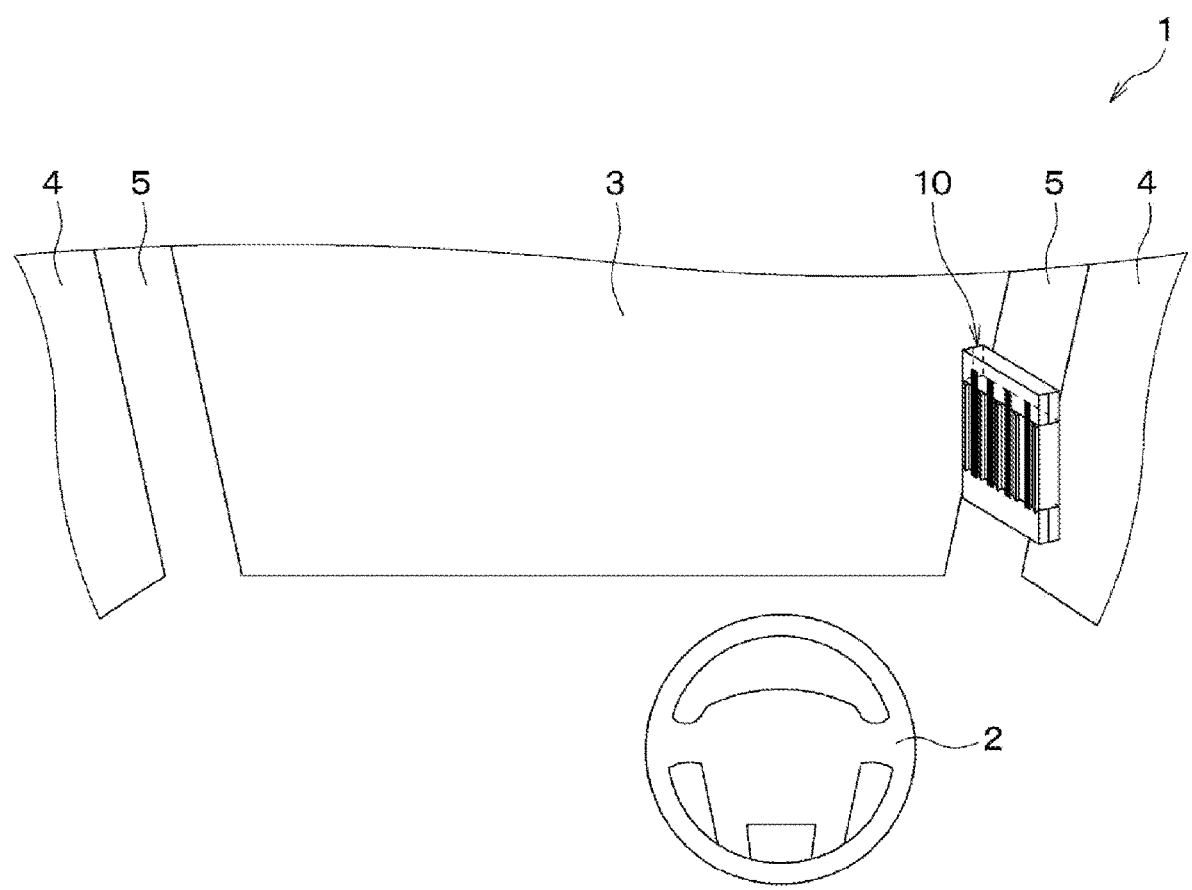
FIG. 1 is a diagram showing a configuration of a vehicle that adopts an optical member according to a first embodiment.

Next, a relevant technology is described only for understanding the following embodiments. A blind area assisting device according to a relevant technology includes a semi-transmissive mirror, a mirror, a light guide body, and multiple prisms. The semi-transmissive mirror is disposed toward a viewer. The mirror reflects light to the semi-transmissive mirror. The light guide body is disposed between the semi-transmissive mirror and the mirror. The prisms are disposed between the semi-transmissive mirror and the viewer.

According to the study by the present inventors, when the blind area assisting device includes the semi-transmissive mirror that has a dielectric multilayer and the like, the number of components of the blind area assisting device is large. Therefore, it is desired to provide a blind area assisting device without a semi-transmissive mirror in order to reduce a cost of the blind area assisting device.

It is conceivable to totally reflect light on a surface of the light guide body instead of the semi-transmissive mirror in order to provide a blind area assisting device without a semi-transmissive mirror. However, in this case, if unnecessary outside light enters the surface of the light guide body, the unnecessary outside light reduces a visibility of a scene in a blind area. Therefore, it is conceivable to provide a light shielding member that blocks the unnecessary outside light. However, a refractive index of the light shielding member and a refractive index of the light guide body are higher than that of an external medium such as air. Thus, in a case where the light shielding member is in contact with the surface of the light guide body, the light that propagates inside the light guide body and is incident on the surface of the light guide body is not totally reflected by the surface of the light guide body, but is refracted to reach the light shielding member. At this time, the light incident on the light shielding member is blocked by the light shielding member. As a result, an outside light from the blind area is not emitted toward the viewer through the light guide body, so that the visibility of the scene in the blind area is reduced. Therefore, it is required that the light shielding member and the surface of the light guide body do not come into contact with each other even in an environment where there is thermal deformation, vibration, or the like.

An optical member according to an aspect of the present disclosure includes a light guide body and a light shielding member. The light guide body includes an incident surface, a first reflecting surface, a second reflecting surface, multiple prisms, and a protruding portion. The incident surface is a surface on which a light from a blind area is incident. The first reflecting surface is configured to reflect the light guided from the incident surface. The second reflecting surface is configured to reflect the light reflected by the first reflecting surface. The prisms protrude from the first reflecting surface in a normal direction of the first reflecting surface. The prisms are arranged at intervals and configured to emit the light guided from the incident surface and the light reflected by the second reflecting surface to an outside of the light guide body. The protruding portion protrudes from the first reflecting surface in the normal direction. The light shielding member is in contact with the protruding portion to provide a space between the light shielding member and the first reflecting surface and covers the first reflecting surface to block a light incident toward the first reflecting surface from the outside of the light guide body.

The space provided in the above configuration makes it difficult for the light shielding member and the first reflecting surface to come into contact with each other. Thus, the contact of the light shielding member with the first reflecting surface can be restricted.

Hereinafter, embodiments will be described with reference to the drawings. In the following embodiments, the same or equivalent portions are denoted by the same reference numerals, and the description thereof will be omitted.

First Embodiment

An optical member 10 according to a first embodiment of the present disclosure can be adopted, for example in a vehicle 1. As shown in FIG. 1, the vehicle 1 includes a steering wheel 2, a front window 3, side windows 4, pillars 5, and the optical member 10. The optical member 10 is attached to, for example, the pillar 5, and guides an outside light Lo from a blind area due to the pillar 5 to an occupant of the vehicle 1, so that a scene in the blind area is visually recognized by the occupant of the vehicle 1. Note that the occupant of the vehicle 1 corresponds to a viewer.

Specifically, as shown in FIGS. 2 to 7, the optical member 10 includes a light guide body 20, multiple light shielding layers 60, a light shielding member 70, a first fixing member 91, a second fixing member 92, and a third fixing member 93, and a fourth fixing member 94. In cross-sectional views in FIGS. 2 to 7, a cross-sectional hatching of the optical member 10 is omitted for easy understanding.

The light guide body 20 is made of a translucent material such as resin material or glass. Examples of the resin material includes polyethylene terephthalate, polycarbonate, polyethylene, acrylic, and the like. The light guide body 20 includes an incident surface 25, multiple first reflecting surfaces 31, a second reflecting surface 32, multiple prisms 40, a first rough surface 201, a second rough surface 202, multiple first protruding portions 211 and multiple second protruding portions 212.

The incident surface 25 is a surface on which the outside light Lo is incident. The first reflecting surfaces 31 are disposed to face the occupant of the vehicle 1 and intersect the incident surface 25. The first reflecting surfaces 31 reflect the light guided from the incident surface 25. The second reflecting surface 32 is connected with the incident surface 25 on a side opposite to the first reflecting surfaces 31 and is parallel to the first reflecting surfaces 31. The second reflecting surface 32 reflects the light reflected by the first reflecting surfaces 31.

Figure 4:
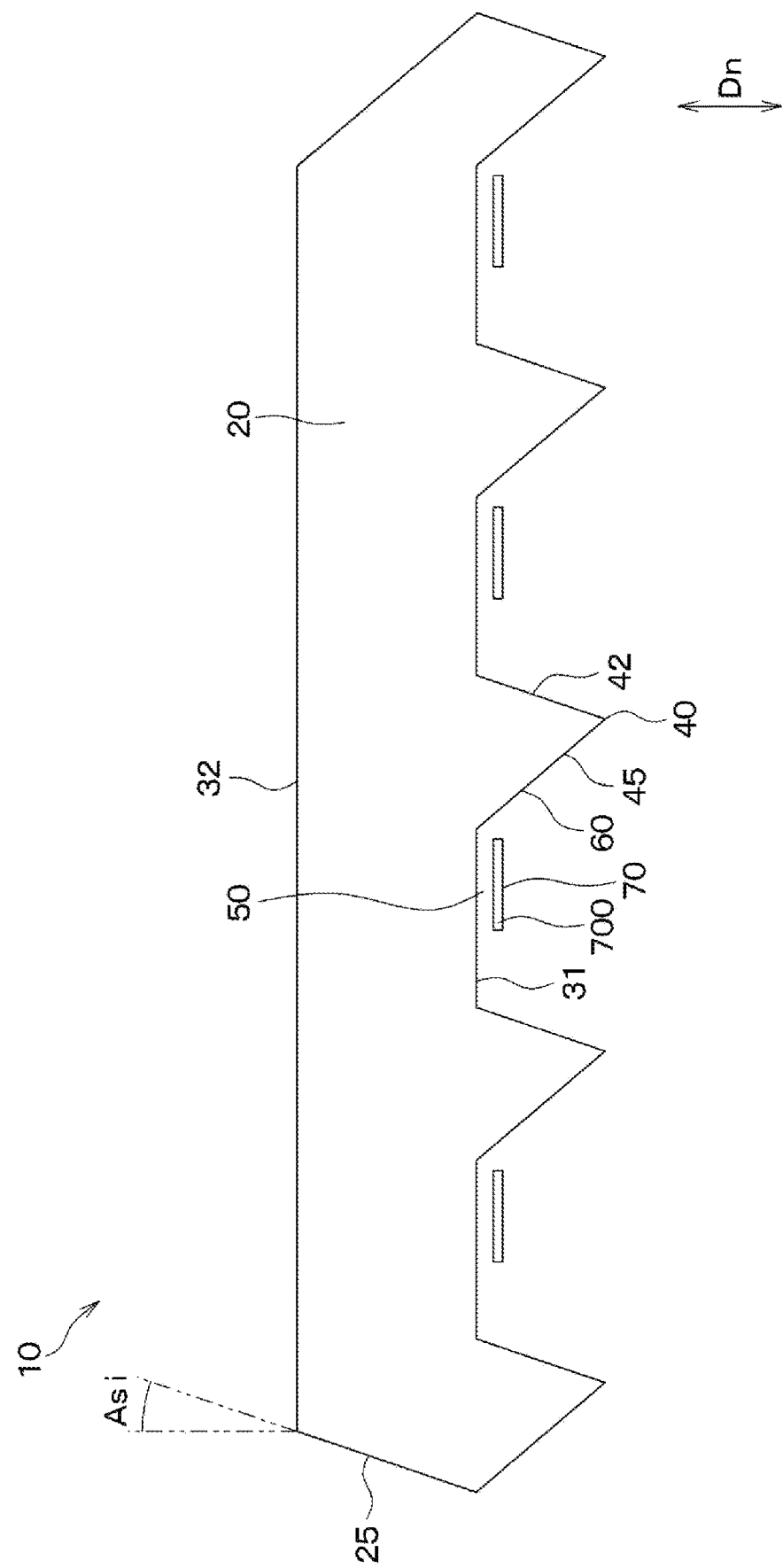
FIG. 4 is an enlarged cross-sectional view of a part of the optical member taken along a line IV-IV in FIG. 3.
Figure 6:
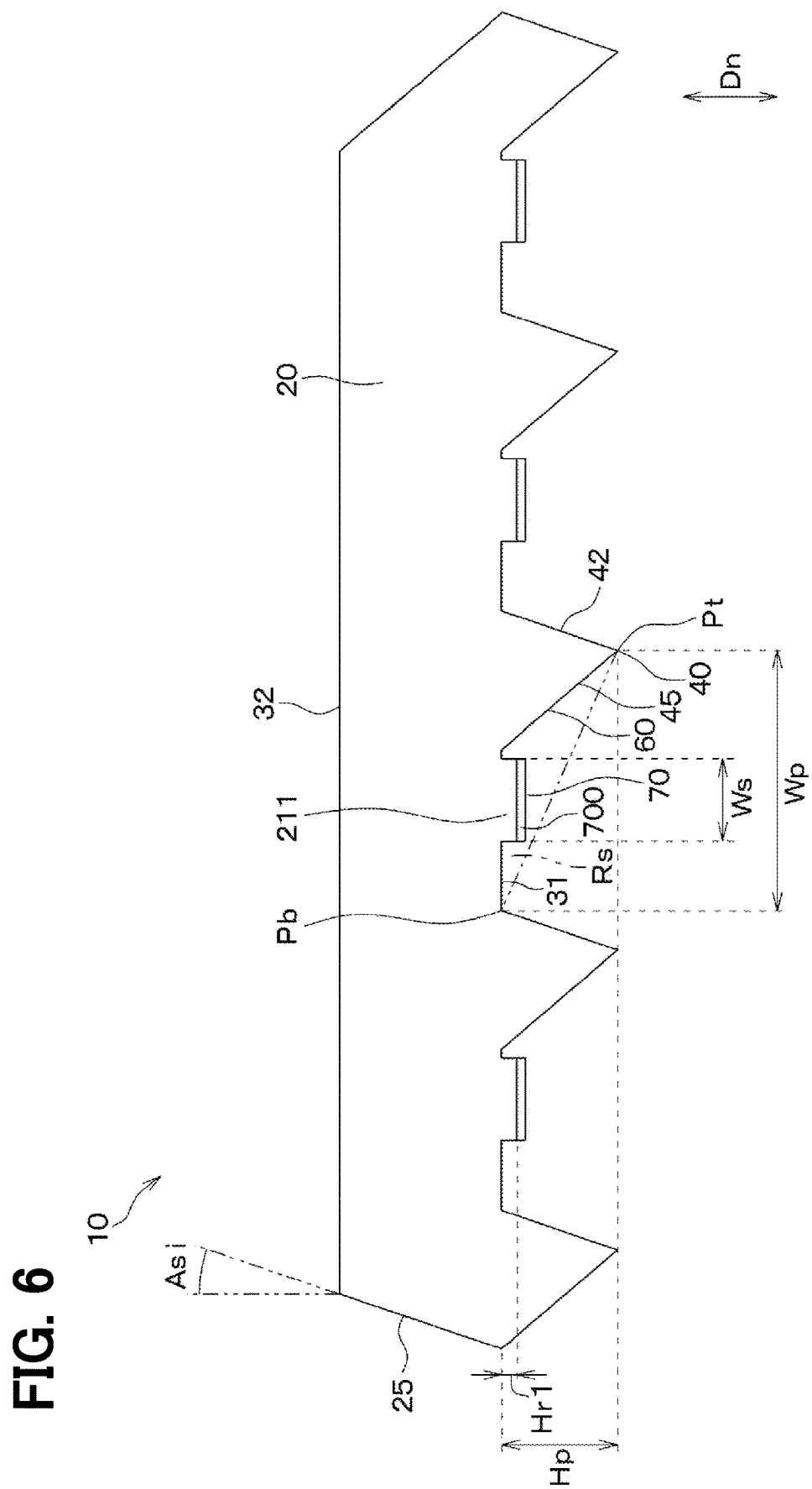
FIG. 6 is an enlarged cross-sectional view of a part of the optical member taken along a line VI-VI in FIG. 3.
Figure 7:
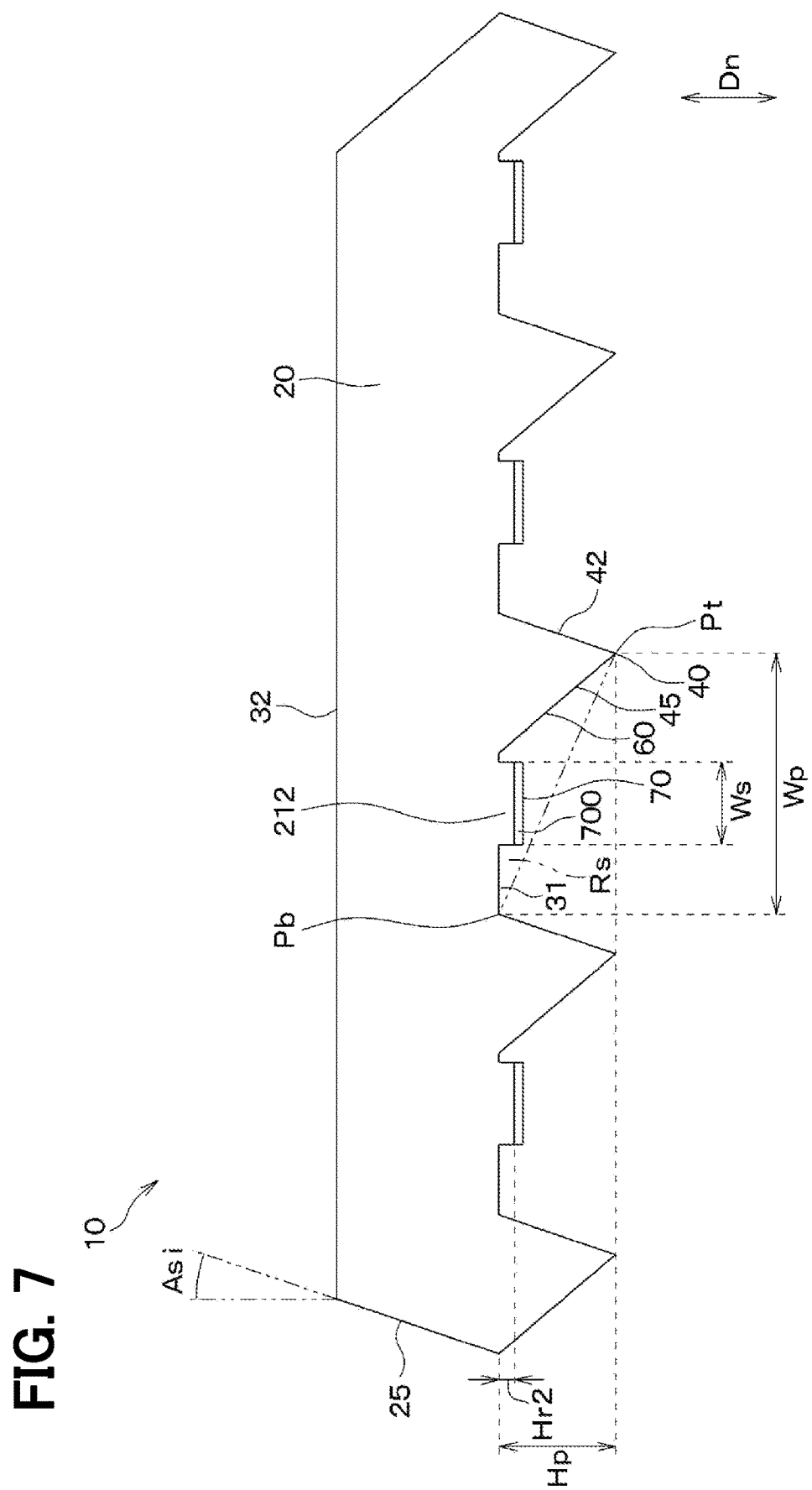
FIG. 7 is an enlarged cross-sectional view of a part of the optical member taken along a line VII-VII in FIG. 3.

Here, a direction of a normal line passing through the first reflecting surface 31 is defined as a normal direction Dn. As shown in FIG. 4, FIG. 6 and FIG. 7, the incident surface 25 is inclined with respect to the normal direction Dn. An incident surface angle Asi, which is an inclination angle of the incident surface 25 with respect to the normal direction Dn, is an acute angle. A refractive index of the light guide body 20 is denoted as n1. A refractive index of an external medium of the light guide body 20 is denoted as n2. An incident angle when the light from the incident surface 25 is reflected by the first reflecting surface 31 and an incident angle when the light reflected by the first reflecting surface 31 is reflected by the second reflecting surface 32 is denoted as θi. The light guide body 20 is configured so as to satisfy the following relational expression (1-1).

$$\sin \theta i \geq \frac{n2}{n1} \tag{1-1}$$

Accordingly, even if the light guide body 20 does not have a semi-transmissive mirror, the light from the incident surface 25 is totally reflected by the first reflecting surfaces 31 and the second reflecting surface 32.

The prisms 40 are formed, for example, by molding, cutting, blasting, or a combination thereof when the light guide body 20 is formed. Each of the prisms 40 protrudes from the first reflecting surfaces 31 and has a triangular prism shape. The prisms 40 are arranged at predetermined intervals. Accordingly, the first reflecting surfaces 31 are arranged at predetermined intervals in an arrangement direction of the prisms 40. Each of the prisms 40 includes a prism exit surface 42 and a prism light-shielding surface 45.

The prism exit surface 42 is connected with the adjacent first reflecting surface 31. The prism exit surface 42 is parallel to the incident surface 25. Thus, the prism exit surface 42 is inclined at the incident surface angle Asi with respect to the normal direction Dn. The prism light-shielding surface 45 corresponds to a non-exit surface and is connected with the prism exit surface 42 while intersecting each other.

Figure 2:
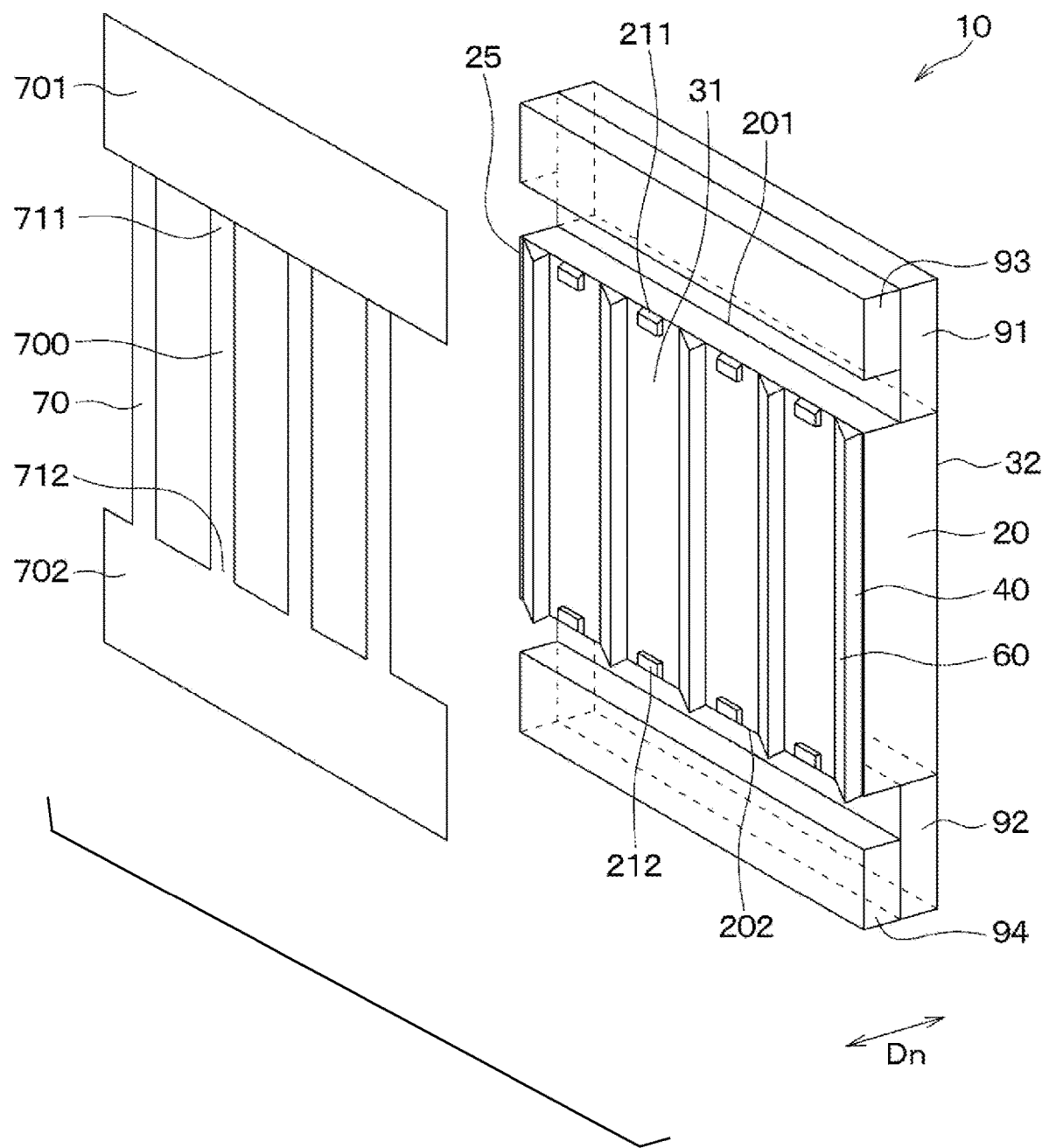
FIG. 2 is an exploded perspective view of the optical member.
Figure 3:
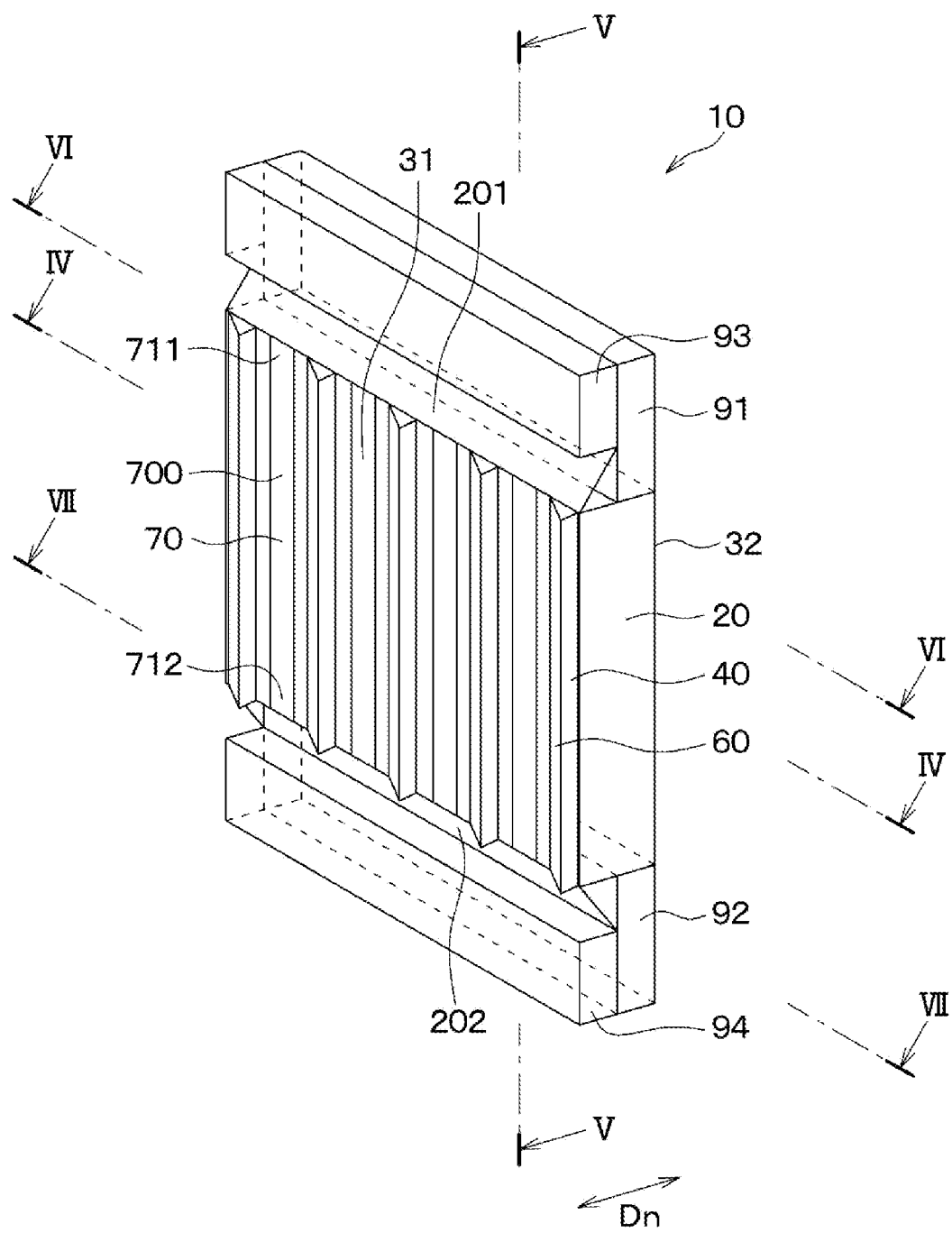
FIG. 3 is a perspective view of the optical member.
Figure 5:
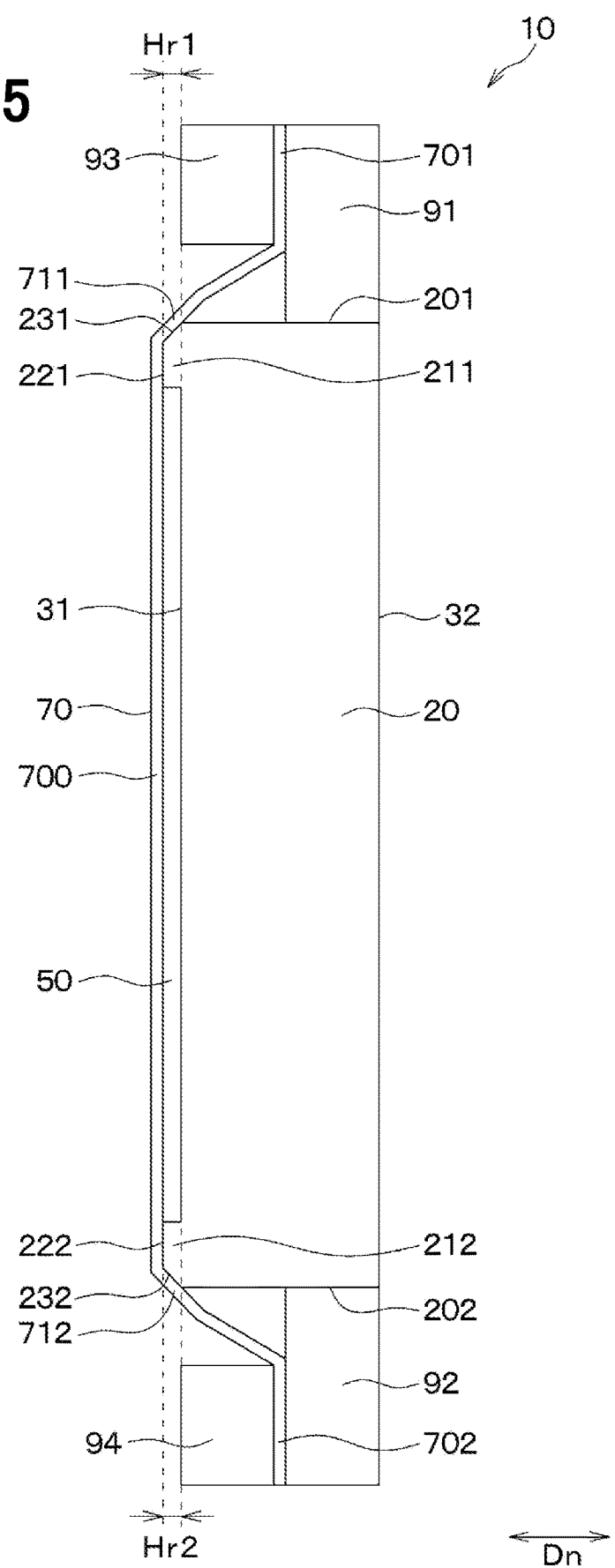
FIG. 5 is an enlarged cross-sectional view of a part of the optical member taken along a line V-V in FIG. 3.

As shown in FIG. 2, FIG. 3, and FIG. 5, the first rough surface 201 is connected with the incident surface 25, the first reflecting surfaces 31 and the second reflecting surface 32 while intersecting each other. The second rough surface 202 is arranged opposite to the first rough surface 201 to face the first rough surface 201, and is connected with the incident surface 25, the first reflecting surfaces 31, and the second reflecting surface 32 while intersecting each other. A surface roughness of the first rough surface 201 and a surface roughness of the second rough surface 202 are larger than those of the incident surface 25, the first reflecting surfaces 31 and the second reflecting surface 32. Accordingly, the first rough surface 201 and the second rough surface 202 are less likely to reflect light. The surface roughness is, for example, the root mean square height, the maximum peak height, the maximum valley height, the maximum height, the calculated average height, or the like, and is measured by a measurement method conforming to ISO 25178 and JIS B 0601.

The first protruding portions 211 protrude in the normal direction Dn respectively from end portions of the first reflecting surfaces 31 close to the first rough surface 201. Each of the first protruding portion 211 has a first contact surface 221 and a first connection surface 231. The first contact surface 221 is orthogonal to the normal direction Dn and is in contact with the light shielding member 70. The first connection surface 231 is connected with the first contact surface 221 and the first rough surface 201. The first connection surface 231 is inclined in such a manner that a first protrusion length Hr1 decreases with increase of a distance from a boundary between the first connection surface 231 and the first contact surface 221, and is in contact with the light shielding member 70. The first protrusion length Hr1 is a length of each of the first protruding portions 211 in the normal direction Dn.

The second protruding portions 212 protrude in the normal direction Dn respectively from end portions of the first reflecting surfaces 31 close to the second rough surface 202.

Each of the second protruding portions 212 includes a second contact surface 222 and a second connection surface 232. The second contact surface 222 is orthogonal to the normal direction Dn and is in contact with the light shielding member 70. The second connection surface 232 is connected with the second contact surface 222 and the second rough surface 202. The second connection surface 232 is inclined in such a manner that a second protrusion length Hr2 decreases with increase of a distance from a boundary between the second connection surface 232 and the second contact surface 222, and is in contact with the light shielding member 70. The second protrusion length Hr2 is a length of each of the second protruding portions 212 in the normal direction Dn.

The light shielding layers 60 are light absorbing films that absorb 99% or more of light. The light shielding layers 60 are formed of, for example, black resin by coating, printing, vapor deposition, or the like. The light shielding layers 60 cover the entire surface of the respective prism light-shielding surfaces 45, as shown in FIG. 4, FIG. 6, and FIG. 7. The light shielding layers 60 block light incident from the occupant side of the vehicle 1 toward the prism light-shielding surfaces 45. The light shielding layers 60 also reduce interfacial reflection when light propagating inside the light guide body 20 enters the prism light-shielding surfaces 45. Although the light shielding layers 60 in this example are made of black resin, the material of the light shielding layers 60 is not limited to black resin. For example, the light shielding layers 60 may be made of metal.

As shown in FIG. 2, the light shielding member 70 has a film shape and is made of a light absorbing material, a light diffusing material, a retroreflecting material, or the like. The light shielding member 70 includes multiple light shielding sections 700, a first fixing section 701, and a second fixing section 702. In the light shielding member 70 shown in FIG. 2, the light shielding sections 700, the first fixing section 701, and the second fixing section 702 are integrated. However, the light shielding sections 700, the first fixing section 701, and the second fixing section 702 may be separated from each other.

Each of the light shielding sections 700 has, for example, a length of several hundreds mm, a width of about 1 mm, and a thickness of several tens to several hundreds μm. As shown in FIGS. 2 to 7, the light shielding sections 700 are arranged at intervals in the arrangement direction of the prisms 40. The light shielding sections 700 extend in a direction from the first rough surface 201 toward the second rough surface 202 and cover the first reflecting surfaces 31 at least partially. The light shielding sections 700 block light incident from the occupant side of the vehicle 1 toward the first reflecting surfaces 31. As shown in FIG. 5, the light shielding sections 700 have first end portions 711 close to the first rough surface 201, and the first end portions 711 are in contact with the first protruding portions 211, respectively. In addition, the light shielding sections 700 have second end portions 712 close to the second rough surface 202, and the second end portions 712 are in contact with the second protruding portions 212, respectively.

The first fixing section 701 is connected with the first end portions 711 and sandwiched between the first fixing member 91 and the third fixing member 93 as described later. The second fixing section 702 is connected with the second end portions 712 and sandwiched between the second fixing member 92 and the fourth fixing member 94 as will be described later.

Each of the first fixing member 91, the second fixing member 92, the third fixing member 93, and the fourth fixing member 94 is formed of resin or the like in a quadrangular prism shape. The first fixing member 91 is connected to the first rough surface 201 by, for example, an adhesive material or the like. The first fixing member 91 and the third fixing member 93 are fixed by, for example, an adhesive material or screws (not shown). The length of the first fixing member 91 in the normal direction Dn is smaller than the distance from the first reflecting surfaces 31 to the second reflecting surface 32 in the normal direction Dn. The first fixing member 91 and the third fixing member 93 sandwich the first fixing section 701 to fix portions of the light shielding sections 700 close to the first rough surface 201. Accordingly, the first end portions 711 of the light shielding sections 700 are bent and pulled.

The second fixing member 92 is connected to the second rough surface 202 by, for example, an adhesive material or the like. The second fixing member 92 and the fourth fixing member 94 are fixed by, for example, an adhesive material or screws (not shown). The length of the second fixing member 92 in the normal direction Dn is smaller than the distance from the first reflecting surfaces 31 to the second reflecting surface 32 in the normal direction Dn. The second fixing member 92 and the fourth fixing member 94 sandwich the second fixing section 702 to fix portions of the light shielding sections 700 close to the second rough surface 202. Accordingly, the second end portions 712 of the light shielding sections 700 are bent and pulled.

Thus, the light shielding sections 700 are pressed against the first protruding portions 211 and the second protruding portions 212, and pulled by the first fixing member 91, the second fixing member 92, the third fixing member 93, and the fourth fixing member 94. Therefore, the light shielding sections 700 are bent. Accordingly, as shown in FIG. 4 and FIG. 5, a space 50 having a length of several hundreds μm in the normal direction Dn is provided between the light shielding sections 700 and the first reflecting surfaces 31.

As described above, the first connection surface 231 is inclined in such a manner that the first protrusion length Hr1 decreases with increase of the distance from the boundary between the first connection surface 231 and the first contact surface 221 and is in contact with the first end portion 711 of the light shielding section 700. Accordingly, the first end portion 711 of the light shielding section 700 is in contact with the first connection surface 231 in addition to the first contact surface 221. Therefore, the first end portion 711 is restricted from being in contact with only a corner of the first contact surface 221 as in a case where the first connection surface 231 is not provided. Thus, the bending of the light shielding section 700 can be reduced by the length of the first connection surface 231 in the normal direction Dn. In addition, the second connection surface 232 is inclined in such a manner that the second protrusion length Hr2 decreases with increase of the distance from the boundary between the second connection surface 232 and the second contact surface 222 and is in contact with the second end portion 712 of the light shielding section 700. Accordingly, the second end portion 712 of the light shielding section 700 is in contact with the second connection surface 232 in addition to the second contact surface 222. Therefore, the second end portion 712 is restricted from being in contact with only a corner of the second contact surface 222 as in a case where the second connection surface 232 is not provided. Thus, the bending of the light shielding section 700 can be reduced by the length of the second connection surface 232 in the normal direction Dn.

As shown in FIG. 6 and FIG. 7, a boundary portion between the first reflecting surface 31 and the prism exit surface 42 is denoted as a first boundary portion Pb. A boundary portion between the prism exit surface 42 and the prism light-shielding surface 45 is denoted as a second boundary portion Pt. In the normal direction Dn, the distance from the first boundary portion Pb to the second boundary portion Pt is denoted as an inter-boundary length Hp. Furthermore, in a direction orthogonal to the normal direction Dn and a direction from the first rough surface 201 toward the second rough surface 202, a distance from the first boundary portion Pb of one of the prisms 40 to the second boundary portion Pt of an adjacent one of the prisms 40 that is adjacent to the one of the prisms 40 is defined as an inter-boundary width Wp. The one of the prisms 40 corresponds to a first prism, and the adjacent one of the prisms 40 corresponds to a second prism adjacent to the first prism. The inter-boundary width Wp is, for example, 1.5 to 2.0 mm. A length of a surface of the light shielding section 700 extending in the direction orthogonal to the normal direction Dn and the direction from the first rough surface 201 toward the second rough surface 202 is denoted as a light shielding section width Ws. In addition, a region defined by the first reflecting surface 31 and the prism light-shielding surface 45 is denoted as a defined region Rs. In FIG. 6, the light shielding section width Ws corresponds to the length in the direction orthogonal to the normal direction Dn and the direction from the first rough surface 201 toward the second rough surface 202. In a case where the surface of the light shielding section 700 is inclined with respect to the direction orthogonal to the normal direction Dn and the direction from the first rough surface 201 toward the second rough surface 202, the light shielding section width Ws is the length of the surface.

At this time, the light guide body 20 and the light shielding section 700 are configured so as to satisfy the following relational expression (1-2).

$$Ws \leq \sqrt{Hp^2 + Wp^2} \qquad (1\text{-}2)$$

Accordingly, the light shielding section width Ws is equal to or less than the distance from the first boundary portion Pb of the one of the prisms 40 to the second boundary portion Pt of the adjacent one of the prisms 40. Therefore, the light shielding section 700 is easily arranged within the defined region Rs. As a result, the prism exit surface 42 is less likely to be covered with the light shielding section 700.

Figure 8:
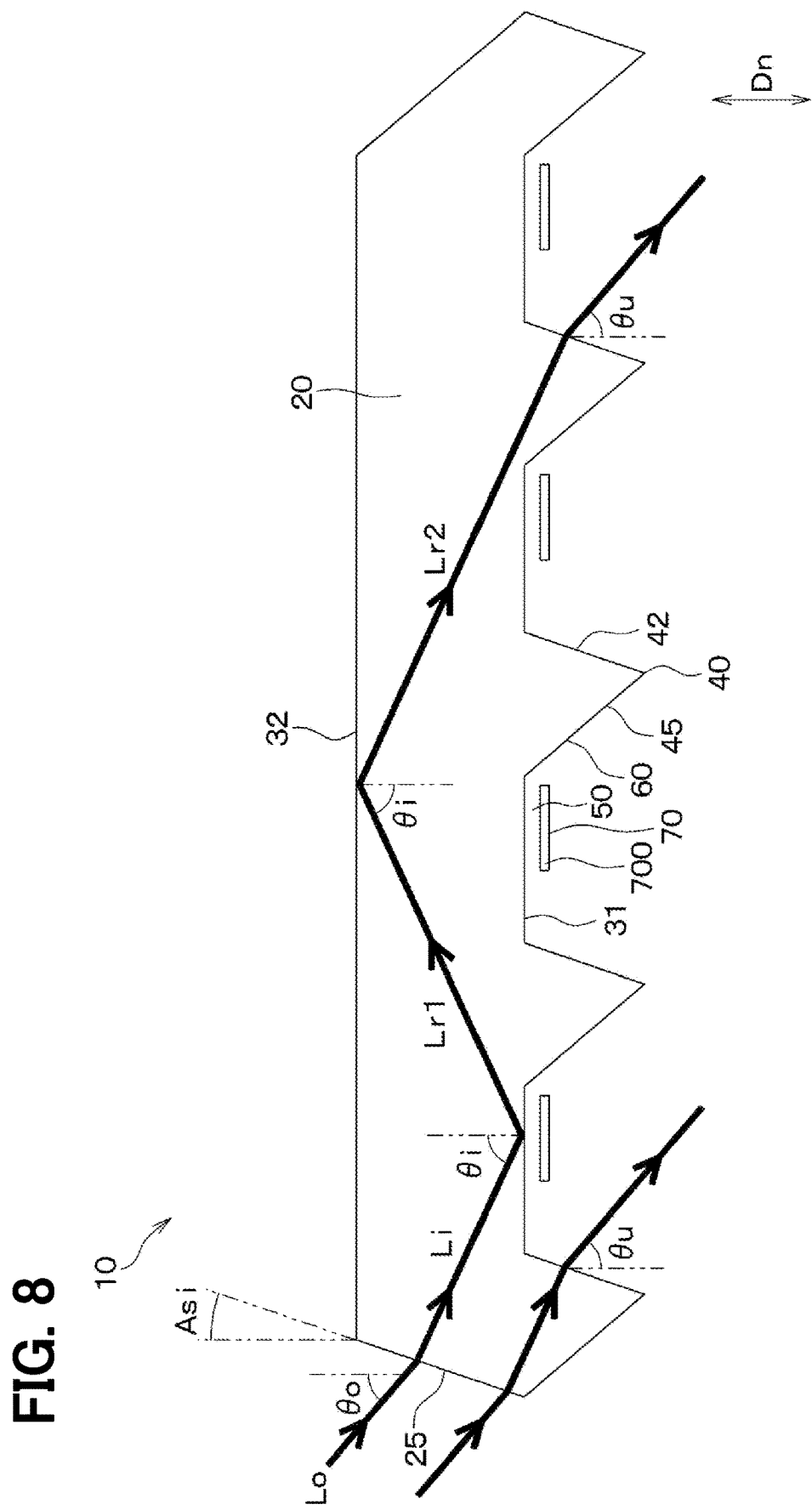
FIG. 8 is a schematic cross-sectional view showing a state in which an outside light is incident on an incident surface of the optical member.

The optical member 10 of the first embodiment is configured as described above. The optical member 10 of the present embodiment makes the scene in the blind area due to the pillars 5 visually recognized by the occupant of the vehicle 1, and restricts the light shielding member 70 from coming into contact with the first reflecting surfaces 31. Next, with reference to FIG. 8, the visual recognition of the scene in the blind area will be described.

For example, when an outside light Lo is incident on the incident surface 25 at an incident angle θo, the outside light Lo is refracted within the light guide body 20 to become an incident light Li. Note that the incident angle θo is an angle formed between a traveling direction of the outside light Lo and the normal direction Dn.

A part of the incident light Li travels toward the first reflecting surface 31 at the incident angle θi and reaches the first reflecting surface 31. The reached incident light Li is totally reflected by the first reflecting surface 31 and becomes a first reflected light Lr1. The first reflected light Lr1 travels toward the second reflecting surface 32 at the incident angle θi and reaches the second reflecting surface 32. The reached first reflected light Lr1 is totally reflected by the second reflecting surface 32 and becomes a second reflected light Lr2. The second reflected light Lr2 travels toward the prism exit surface 42 and reaches the prism exit surface 42. The reached second reflected light Lr2 exits from the prism exit surface 42 at an exit angle θu that is the same as the incident angle θo, and becomes an exit light Lu. The exit light Lu travels toward and reaches the occupant of the vehicle 1, so that the scene in the blind area due to the pillar 5 is visually recognized by the occupant. The incident angle θi is the angle formed between the traveling direction of the incident light Li and the normal direction Dn. The exit angle θu is the angle formed by the traveling direction of the exit light Lu and the normal direction Dn. Since Asi<π/2-θi is satisfied, the incident angle θi is greater than the incident angle θo. Accordingly, the incident light Li travels toward a wide range of the first reflecting surfaces 31. In addition, an inclination angle of the prism light-shielding surface 45 with respect to the normal direction Dn is greater than or equal to the incident angle θo. Since the exit light Lu exits to the outside without being blocked by the prism light-shielding surface 45, the loss of the light amount in the emission is reduced.

A part of the incident light Li travels toward the prism exit surface 42 and reaches the prism exit surface 42. The reached incident light Li exits from the prism exit surface 42 at an exit angle θu that is the same as the incident angle θo, and becomes an exit light Lu. The exit light Lu travels toward and reaches the occupant of the vehicle 1, so that the scene in the blind area due to the pillar 5 is visually recognized by the occupant.

As described above, the scene in the blind area due to the pillar 5 is visually recognized by the occupant of the vehicle 1. Next, a mechanism of restricting the light shielding member 70 from coming into contact with the first reflecting surfaces 31 of the light guide body 20 will be described.

Since the light shielding section 700 is in contact with the first protruding portion 211 and the second protruding portion 212, the space 50 is provided between the light shielding section 700 and the first reflecting surface 31. The space 50 makes it difficult for the light shielding section 700 and the first reflecting surface 31 to come into contact with each other. Thus, the contact of the light shielding member 70 with the first reflecting surface 31 can be restricted.

The first embodiment also achieves the following effects.

The first connection surface 231 is inclined in such a manner that the first protrusion length Hr1 decreases with increase of the distance from the boundary between the first connection surface 231 and the first contact surface 221, and is in contact with the first end portion 711 of the light shielding section 700. Accordingly, the first end portion 711 of the light shielding section 700 is in contact with the first connection surface 231 in addition to the first contact surface 221. Therefore, the first end portion 711 is restricted from being in contact with only the corner of the first contact surface 221 as in the case where the first connection surface 231 is not provided. Thus, the bending of the light shielding section 700 can be reduced by the length of the first connection surface 231 in the normal direction Dn. Since the bending of the light shielding section 700 in the direction in which the space 50 expands is reduced, the first reflecting surface 31 and the light shielding section 700 are restricted from being too far apart in the normal direction Dn. As a result, the exit light Lu is less likely to be blocked by the light shielding section 700, and the exit light Lu is restricted from being interfered by the light shielding section 700. The second connection surface 232 is inclined in such a manner that the second protrusion length Hr2 decreases with increase of the distance from the boundary between the second connection surface 232 and the second contact surface 222, and is in contact with the second end portion 712 of the light shielding section 700. Accordingly, the second end portion 712 of the light shielding section 700 is in contact with the second connection surface 232 in addition to the second contact surface 222. Therefore, the second end portion 712 is restricted from being in contact with only the corner of the second contact surface 222 as in the case where the second connection surface 232 is not provided. Thus, the bending of the light shielding section 700 can be reduced by the length of the second connection surface 232 in the normal direction Dn. Since the bending of the light shielding section 700 in the direction in which the space 50 expands is reduced, the first reflecting surface 31 and the light shielding section 700 are restricted from being too far apart in the normal direction Dn. As a result, the exit light Lu is less likely to be blocked by the light shielding section 700, and the exit light Lu is restricted from being interfered by the light shielding section 700.

At this time, the light guide body 20 and the light shielding section 700 are configured so as to satisfy the relational expression (1-2). Accordingly, the light shielding section width Ws is equal to or less than the distance from the first boundary portion Pb of the one of the prisms 40 to the second boundary portion Pt of the adjacent one of the prisms 40. Therefore, the light shielding section 700 is easily arranged within the defined region Rs. As a result, the prism exit surface 42 is less likely to be covered with the light shielding section 700. Therefore, the exit light Lu is less likely to be blocked by the light shielding section 700, and the visibility of the scene in the blind area is improved.

Second Embodiment

Figure 9:
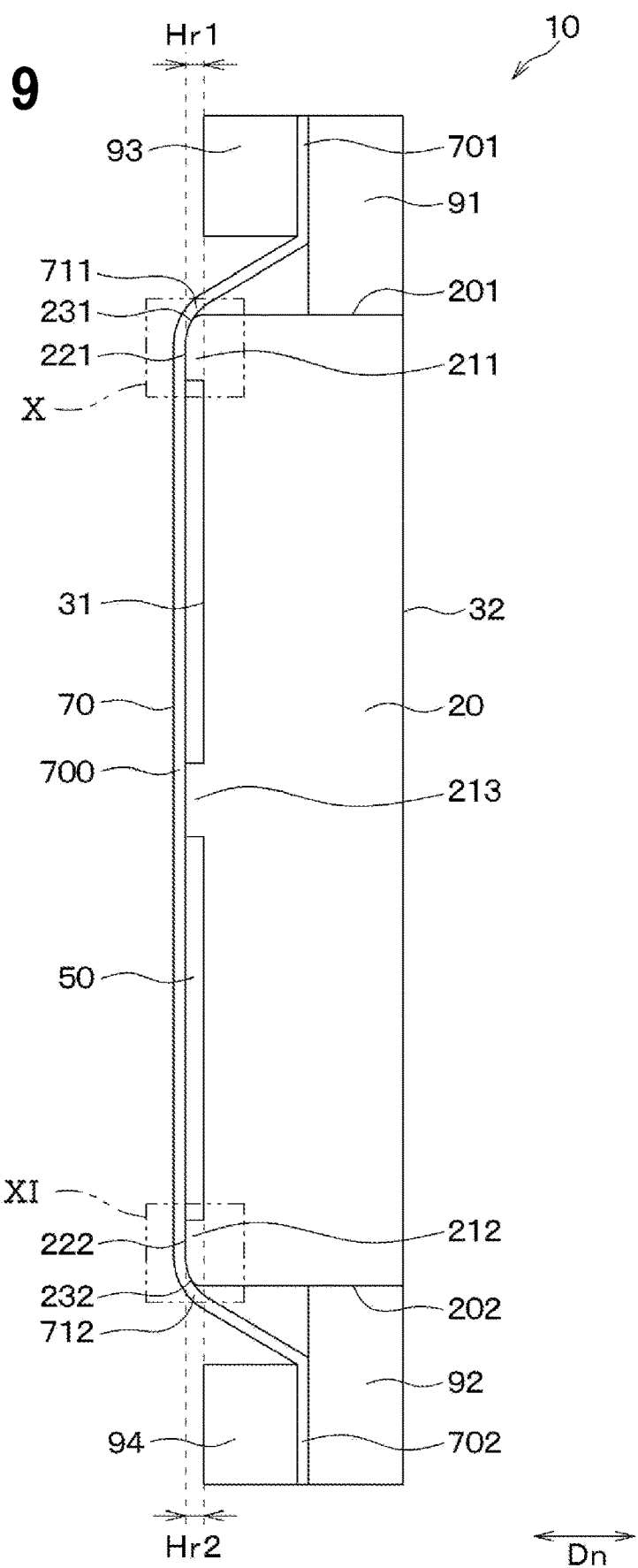
FIG. 9 is a cross-sectional view of an optical member according to a second embodiment.
Figure 10:
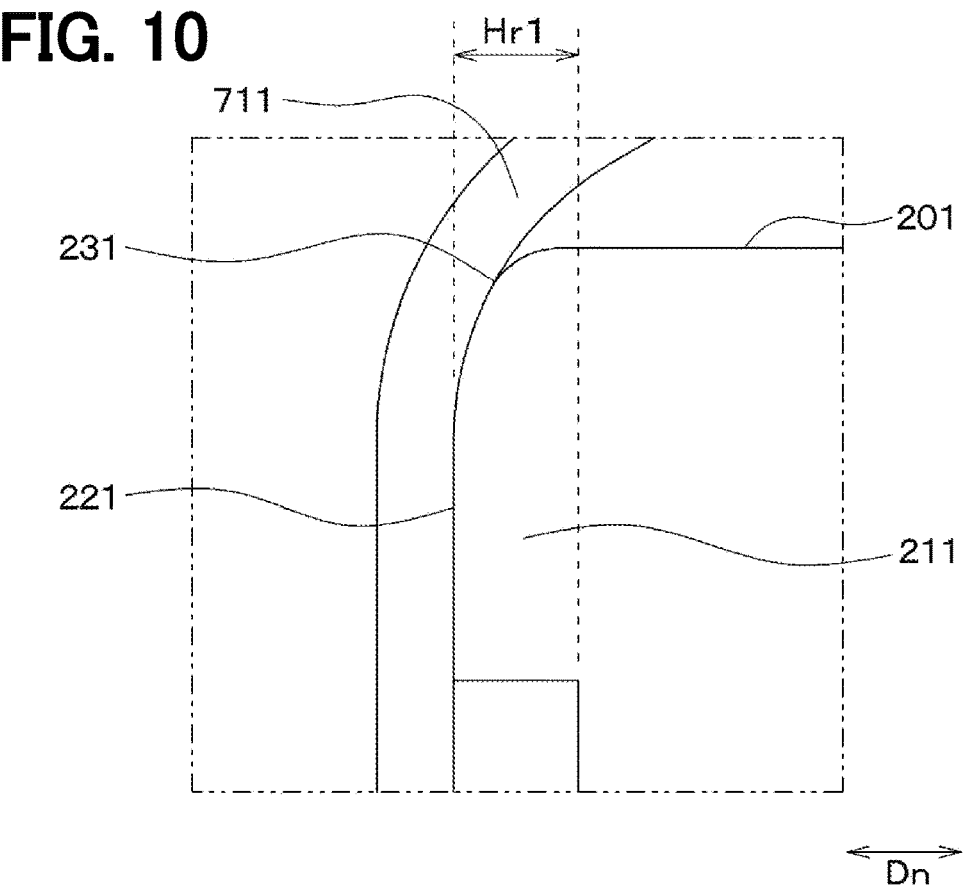
FIG. 10 is an enlarged view of a part X in FIG. 9.
Figure 11:
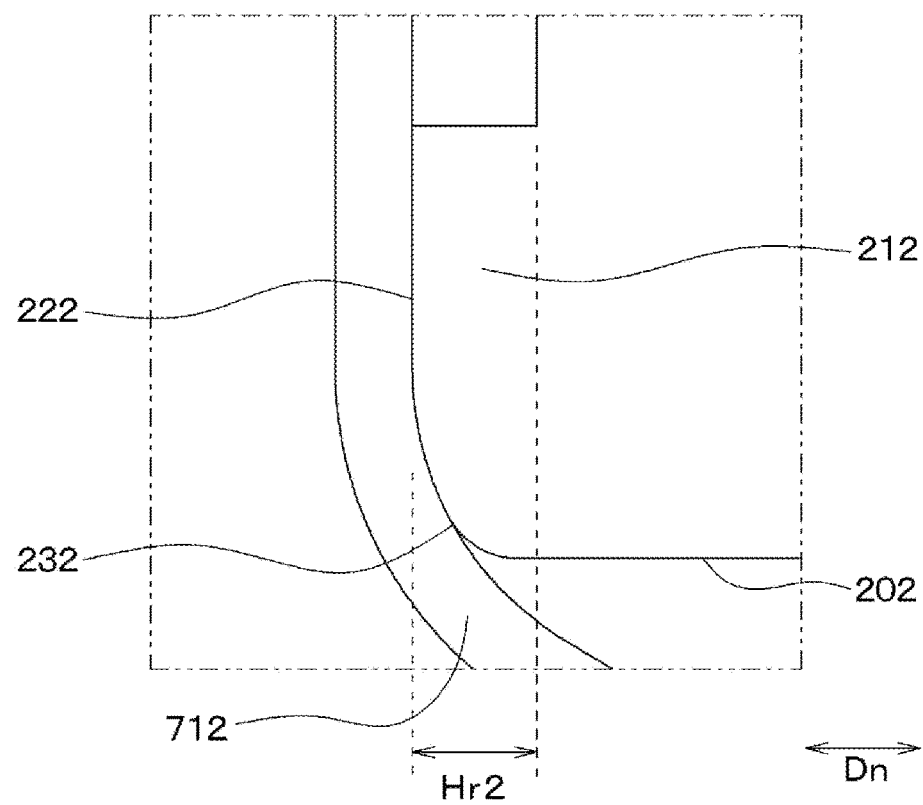
FIG. 11 is an enlarged view of a part XI in FIG. 9.

A light guide body 20 according to a second embodiment further includes, as shown in FIGS. 9 to 11, third protruding portions 213 in addition to the first protruding portions 211 and the second protruding portions 212. Furthermore, the shapes of the first protruding portions 211 and the second protruding portions 212 are different from those of the first embodiment. The other configurations are similar to those of the first embodiment.

As shown in FIG. 9, the third protruding portions 213 respectively protrude from the first reflecting surfaces 31 in the normal direction Dn and are in contact with centers of the light shielding sections 700. As shown in FIG. 10, the first connection surface 231 of each of the first protruding portions 211 has a curved surface instead of a flat surface. The first connection surface 231 is curved in such a manner that the first protrusion length Hr1 decreases in a direction from the first contact surface 221 toward the first rough surface 201. Accordingly, the first end portion 711 of each of the light shielding sections 700 is curved along the first connection surface 231. As shown in FIG. 11, the second connection surface 232 of each of the second protruding portions 212 has a curved surface instead of a flat surface. The second connection surface 232 is curved in such a manner that the second protrusion length Hr2 decreases in a direction from the second contact surface 222 toward the second rough surface 202. Therefore, the second end portion 712 of each of the light shielding sections 700 is curved along the second connection surface 232.

The optical member 10 of the second embodiment is configured as described above. The second embodiment achieves effects similar to the effects achieved by the first embodiment. The second embodiment also achieves the following effects.

The third protruding portions 213 respectively protrude from the first reflecting surfaces 31 in the normal direction Dn so as to be in contact with the centers of the light shielding sections 700 in the direction from the first rough surface 201 toward the second rough surface 202. Accordingly, the centers of the light shielding sections 700 are supported, and a stress at the centers of the light shielding sections 700 is reduced. Therefore, the light shielding sections 700 are less likely to be sagged.

Third Embodiment

Figure 12:
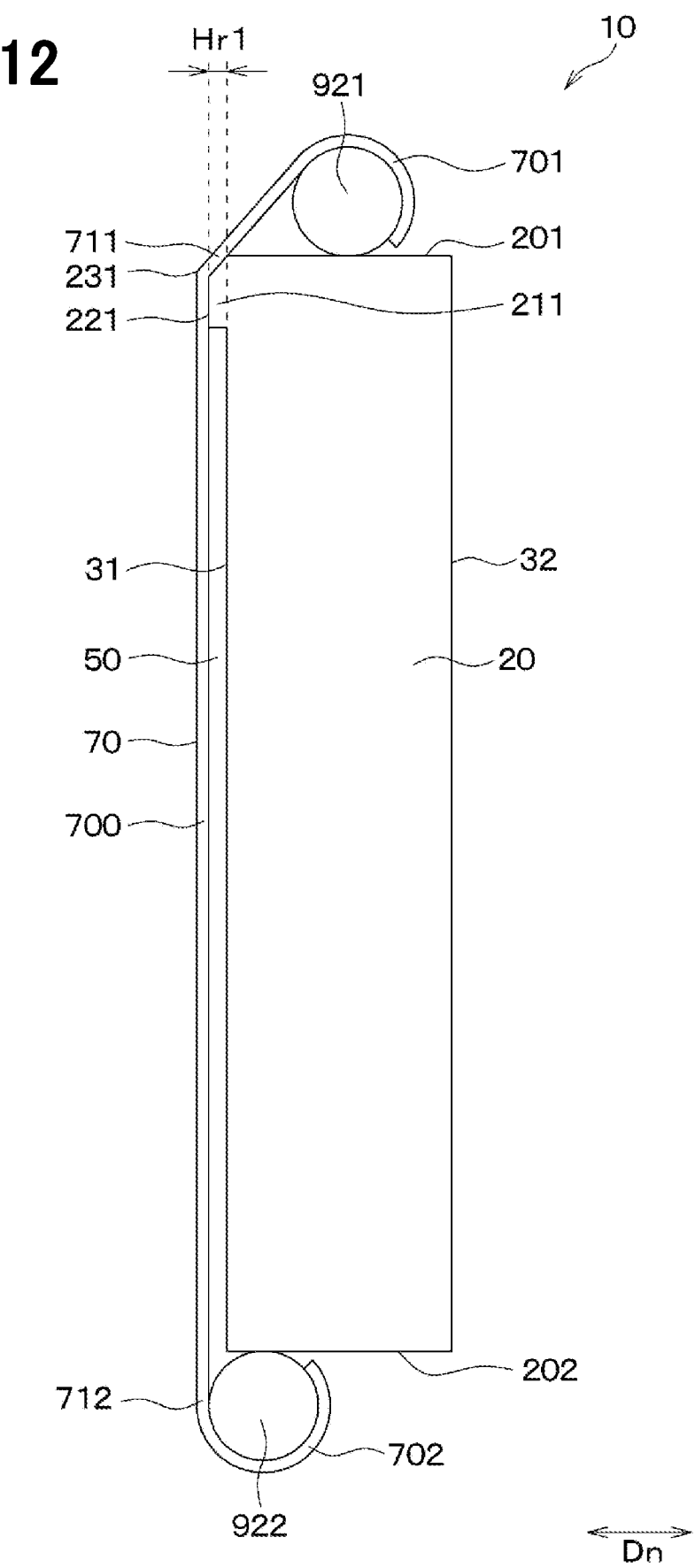
FIG. 12 is a cross-sectional view of an optical member according to a third embodiment.

A light guide body 20 according to a third embodiment includes protruding portions 211 but does not include the second protruding portions 212 as shown in FIG. 12. An optical member 10 according to the third embodiment includes a first rod member 921 and a second rod member 922 instead of the first fixing member 91, the second fixing member 92, the third fixing member 93, and the fourth fixing member 94. The other configurations are similar to those of the first embodiment.

The protruding portions 211 correspond to the first protruding portions 211. Therefore, detailed description of the protruding portions 211 is omitted. In FIG. 12, the protruding portions 211 respectively protrude in the normal direction Dn from the end portions of the first reflecting surfaces 31 close to first rough surface 201. However, the positions of the protruding portions 211 are not limited to the above example. For example, the protruding portions 211 may respectively protrude in the normal direction Dn from the end portions of the first reflecting surfaces 31 close to the second rough surface 202. As another example, the protruding portions 211 may respectively protrude in the normal direction from the center portions of the first reflecting surfaces 31.

The first rod member 921 is formed in a cylindrical shape and extends in a direction orthogonal to the normal direction Dn and the direction from the first rough surface 201 toward the second rough surface 202. The first rod member 921 is connected to the first rough surface 201 by, for example, an adhesive material or the like. The first fixing section 701 of the light shielding member 70 is wound around the first rod member 921. Accordingly, the first end portion 711 of each of the light shielding sections 700 is bent and pulled.

The second rod member 922 is formed in a cylindrical shape and extends in a direction orthogonal to the normal direction Dn and the direction from the first rough surface 201 toward the second rough surface 202. The second rod member 922 is connected to the second rough surface 202 by, for example, an adhesive material or the like, and is in contact with the second end portion 712 of each of the light shielding sections 700. The second fixing section 702 of the light shielding member 70 is wound around the second rod member 922. Therefore, the light shielding sections 700 are pulled.

The optical member 10 of the third embodiment is configured as described above. The third embodiment achieves effects similar to the effects achieved by the first embodiment. The third embodiment also achieves the following effects.

The light guide body 20 according to the third embodiment includes the protruding portions 211 and does not include the second protruding portions 212. As compared with a case of forming the light guide body 20 having both the first protruding portions 211 and the second protruding portions 212, the elimination of the second protruding portions 212 facilitates the forming of the light guide body 20.

Fourth Embodiment

Figure 13:
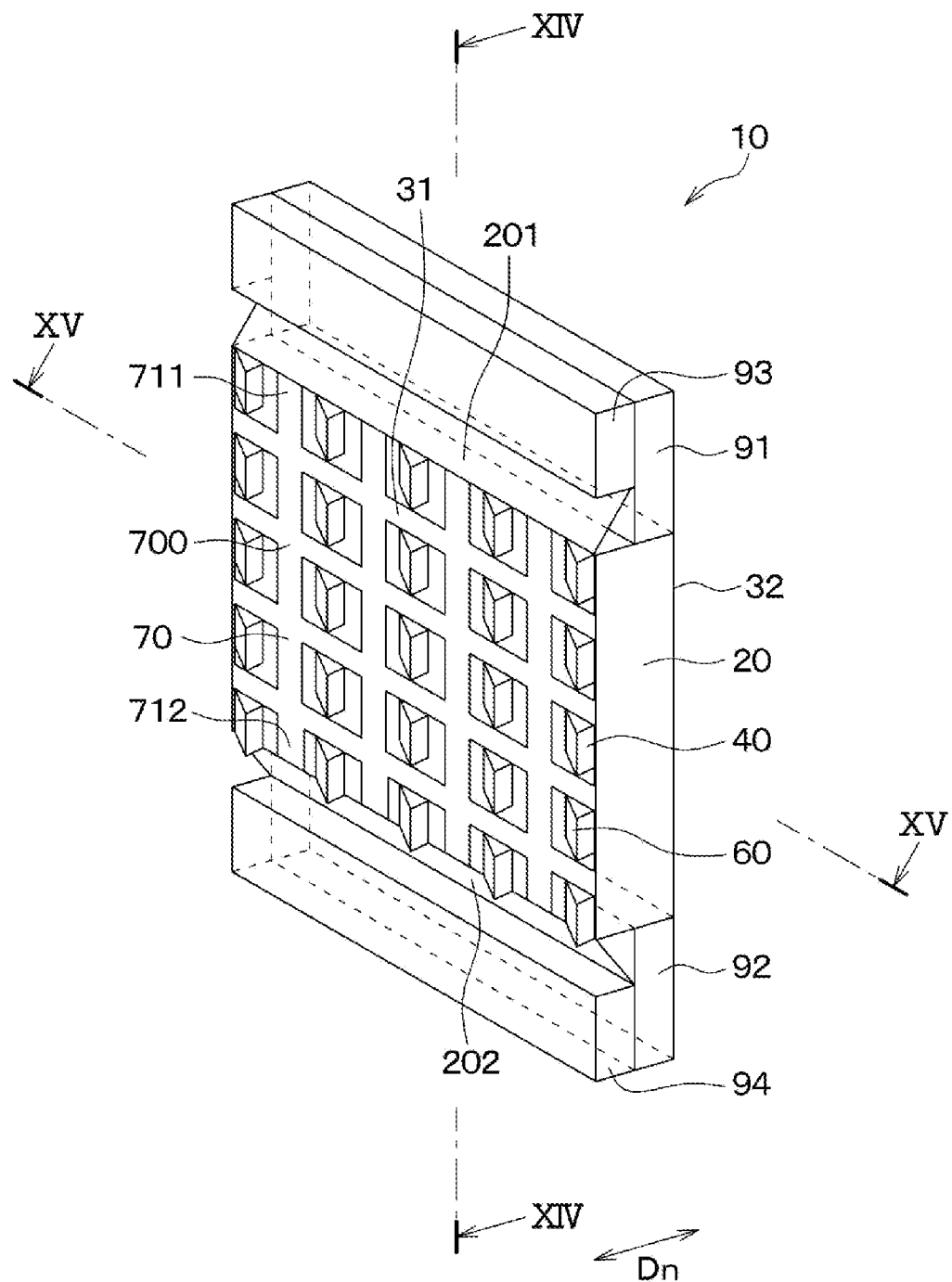
FIG. 13 is a perspective view of an optical member according to a fourth embodiment.
Figure 14:
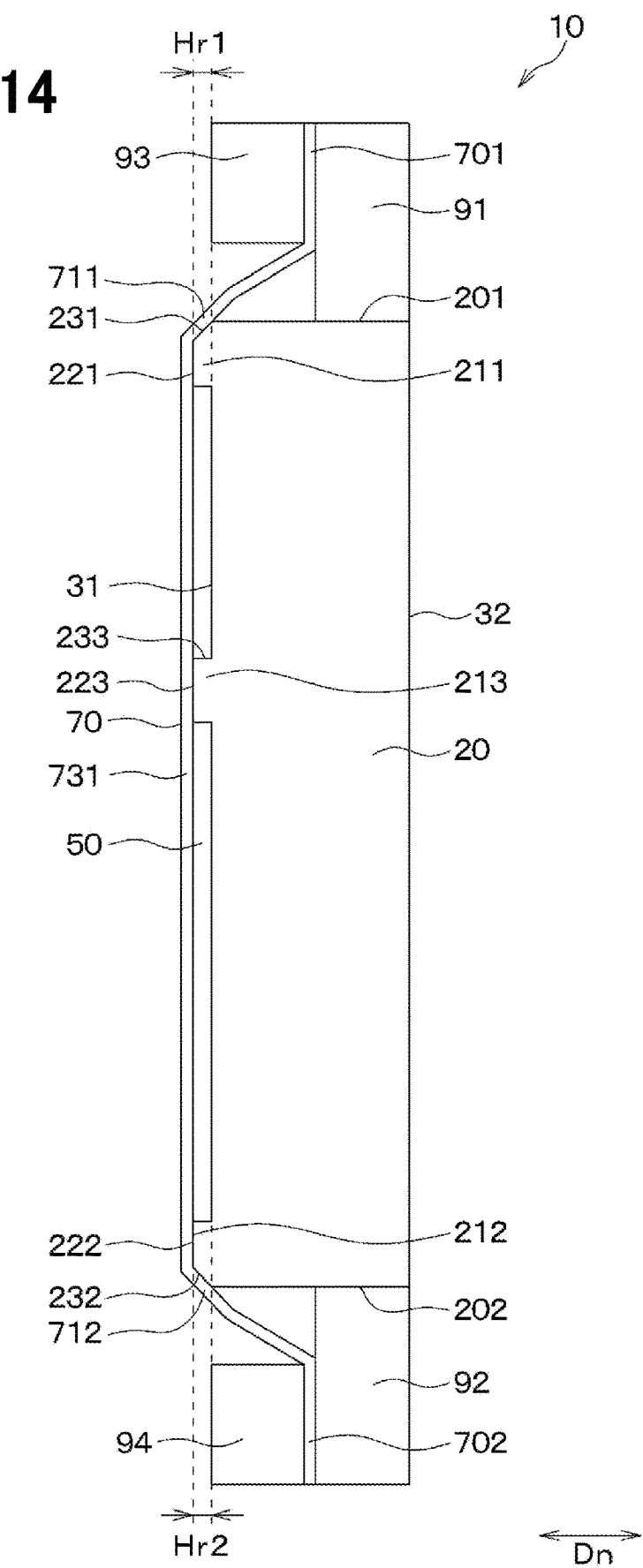
FIG. 14 is an enlarged cross-sectional view of the optical member taken along a line XIV-XIV in FIG. 13.
Figure 15:
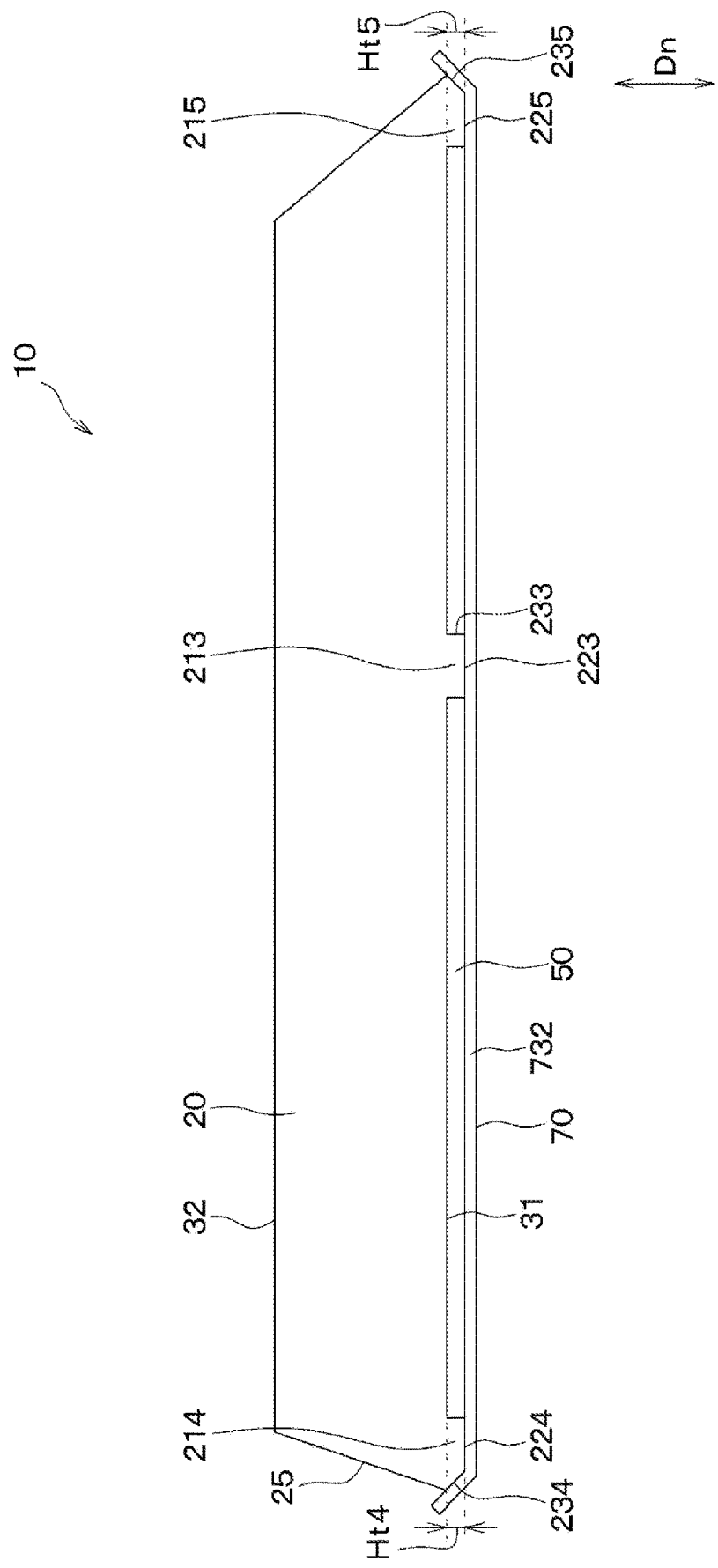
FIG. 15 is an enlarged cross-sectional view of the optical member taken along a line XV-XV in FIG. 13.

In a light guide body 20 according to a fourth embodiment, as shown in FIG. 13, FIG. 14, and FIG. 15, the arrangement and the shape of the prisms 40 are different from those of the first embodiment. In addition, the shape of the light shielding member 70 is different from that of the first embodiment. The light guide body 20 includes a third protruding portion 213, a fourth protruding portion 214, and a fifth protruding portion 215 in addition to the first protruding portions 211 and the second protruding portions 212. The other configurations are similar to those of the first embodiment.

As shown in FIG. 13, each of the prisms 40 protrudes from the first reflecting surface 31 in the normal direction Dn and has a triangular prism shape. The prisms 40 are arranged at intervals in the direction orthogonal to the normal direction Dn and the direction from the first rough surface 201 toward the second rough surface 202. Furthermore, the prisms 40 are arranged at intervals in the direction from the first rough surface 201 toward the second rough surface 202. Thus, the prisms 40 are arranged two-dimensionally. Since the first reflecting surface 31 is located between any two of the prisms 40 adjacent to each other, the first reflecting surface 31 is a latticed plane.

The light shielding member 70 according to the fourth embodiment includes multiple first light shielding sections 731, multiple light shielding sections 732, a first fixing section 701, and a second fixing section 702. In the light shielding member 70 shown in FIGS. 13 to 15, the first light shielding sections 731, the second light shielding sections 732, the first fixing section 701 and the second fixing section 702 are integrated. However, the first light shielding sections 731, the second light shielding sections 732, the first fixing section 701, and the second fixing section 702 may be separated from each other.

The first light shielding sections 731 are arranged in the direction orthogonal to the normal direction Dn and the direction from the first rough surface 201 toward the second rough surface 202, and extend in the direction from the first rough surface 201 toward the second rough surface 202. Accordingly, the first light shielding sections 731 cover at least partially portions of the first reflecting surface 31 extending in the direction from the first rough surface 201 toward the second rough surface 202. The first light shielding sections 731 block light incident from the occupant side of the vehicle 1 toward the first reflecting surfaces 31.

The second light shielding sections 732 are arranged in the direction from the first rough surface toward the second rough surface 202, and extend in the direction orthogonal to the normal direction Dn and the direction from the first rough surface 201 toward the second rough surface 202 while intersecting the first light shielding sections 731. Accordingly, the second light shielding sections 732 cover at least partially portions of the first reflecting surface 31 extending in the direction orthogonal to the normal direction Dn and the direction from the first rough surface 201 toward the second rough surface 202. Thus, the second light shielding sections 732 block light incident from the occupant side of the vehicle 1 toward the first reflecting surfaces 31.

As shown in FIG. 14, the first protruding portion 211 and the second protruding portion 212 are formed in a manner similar to those of the first embodiment. Therefore, detailed description of the first protruding portion 211 and the second protruding portion 212 is omitted.

The third protruding portion 213 protrudes in the normal direction from a vicinity of a center portion of the first reflecting surface 31. The third protruding portion 213 includes a third contact surface 223 and a third connection surface 233. The third contact surface 223 is orthogonal to the normal direction and is in contact with a portion of the light shielding member 70 at which the first light shielding section 731 and the second light shielding section 732 intersect each other. The third connection surface 233 is connected with the third contact surface 223 and the first reflecting surface 31.

As shown in FIG. 15, the fourth protruding portion 214 protrudes in the normal direction Dn from an end portion of the first reflecting surface 31 close to the incident surface 25. The fourth protruding portion 214 includes a fourth contact surface 224 and a fourth connection surface 234. The fourth contact surface 224 is orthogonal to the normal direction Dn and is in contact with the second light shielding section 732. The fourth connection surface 234 is connected with the fourth contact surface 224 and the incident surface 25. The fourth connection surface 234 is inclined in such a manner that a fourth protrusion length Hr4 decreases with increase of a distance from a boundary between the fourth connection surface 234 and the fourth contact surface 224 and is in contact with an end portion of the second light shielding section 732. Therefore, the end portion of the second light shielding section 732 is restricted from being in contact with only a corner of the fourth contact surface 224 as in a case where the fourth connection surface 234 is not provided. Accordingly, a contact area of the second light shielding section 732 and the fourth protruding portion 214 is increased as compared with a case where the second light shielding section 732 and only the fourth contact surface 224 are in contact. Thus, the second light shielding section 732 is stably supported by the fourth protruding portion 214. The fourth protrusion length Hr4 is a length of the fourth protruding portion 214 in the normal direction Dn. The fourth connection surface 234 is not limited to being flat, and may be curved, for example.

The fifth protruding portion 215 protrudes in the normal direction Dn from end portion of the first reflecting surface 31 opposite to the incident surface 25. The fifth protruding portion 215 includes a fifth contact surface 225 and a fifth connection surface 235. The fifth contact surface 225 is orthogonal to the normal direction Dn and is in contact with the second light shielding section 732. The fifth connection surface 235 is connected with the fifth contact surface 225 and a surface opposite to the incident surface 25. The fifth connection surface 235 is inclined in such a manner that a fifth protrusion length Hr5 decreases with increase of a distance from a boundary between the fifth connection surface 235 and the fifth contact surface 225 and is in contact with an end portion of the second light shielding section 732. Therefore, the end portion of the second light shielding section 732 is restricted from being in contact with only a corner of the fifth contact surface 225 as in a case where the fifth connection surface 235 is not provided. Accordingly, a contact area of the second light shielding section 732 and the fifth protruding portion 215 is increased as compared with a case where the second light shielding section 732 and only the fifth contact surface 225 are in contact. Thus, the second light shielding section 732 is stably supported by the fifth protruding portion 215. Since the second light shielding section 732 is supported by the fourth protruding portion 214 and the fifth protruding portion 215, the second light shielding section 732 is bent. Accordingly, a space 50 having a length of several hundreds μm in the normal direction Dn is provided between the second light shielding section 732 and the first reflecting surface 31. The fifth protrusion length Hr5 is a length of the fifth protruding portions 215 in the normal direction Dn. The fifth connection surface 235 is not limited to being flat, and may be curved, for example.

The optical member 10 of the fourth embodiment is configured as described above. The fourth embodiment achieves effects similar to the effects achieved by the first embodiment. The fourth embodiment also achieves the following effects.

A blind area assisting device according to a comparative example includes comparative prisms and comparative light shielding layers partially covering the comparative prisms. The comparative prisms extend in a vertical direction and are arranged in a horizontal direction. Thus, comparative light shielding layers also extend in the vertical direction and are arranged in the horizontal direction. Thus, in a case where the comparative light shielding layers are made of, for example, black resin, and when a viewer looks at the blind area assisting device, the comparative light shielding layers look like black stripes each extending in the vertical direction and arranged in the horizontal direction.

When the viewer looks at the scene, if the convergence and the accommodation of the both eyes of the viewer are adjusted with respect to the scene, the black stripes on the blind area assisting device may be superimposed at different positions on the scene for the left and right eyes. At this time, when the ratio of the visual field of the black stripes to the scene viewed through the blind area assisting device increases, the degree of mismatch of information between the left and right eyes increases. Thus, a visual attraction, which indicates the ease of recognizing the stripes by the viewer, increases. Accordingly, recognition of the scene in a blind area reflected in the blind area assisting device is lowered, so that the visibility of the scene in the blind area is lowered.

On the other hand, in the present embodiment, the light shielding layers 60 respectively cover the prism light shielding surfaces 45 of the prisms 40, and the prisms 40 are arranged in the direction from the first rough surface 201 toward the second rough surface 202. The prisms 40 are also arranged in the direction orthogonal to the normal direction Dn and the direction from the first rough surface 201 toward the second rough surface 202. The direction from the first rough surface 201 toward the second rough surface 202 corresponds to a first direction orthogonal to the normal direction Dn. The direction orthogonal to the normal direction Dn and the direction from the first rough surface 201 toward the second rough surface 202 corresponds to a second direction orthogonal to the normal direction Dn and the first direction. The first direction may be a direction intersecting the normal direction Dn. The second direction may be a direction intersecting the normal direction Dn and the first direction.

Accordingly, when the total area of the prisms 40 when viewed in the normal direction Dn is constant, the length of the prisms 40 in the second direction, for example, the vertical direction can be decreased by increasing the length of the prisms 40 in the first direction, for example, the horizontal direction. In this case, the ratio of the stripes in the horizontal direction by the light shielding layers 60 covering the prisms 40 increases, but the ratio of the stripes in the vertical direction decreases. As long as the viewer rotates his or her face in the horizontal plane, the positions of the horizontal stripes superimposed on the scene of the blind area are the same for the left and right eyes. Therefore, the black stripes are restricted from being emphasized and the visual attraction is reduced as compared with the case where the total area of the prisms 40 is constant and there are only vertical stripes. Therefore, deterioration in recognition of the scene in the blind area reflected on the optical member 10 can be restricted.

Since the prisms 40 are arranged at intervals in the first direction and the second direction, the first reflecting surface 31 is located between any two of the prisms 40 adjacent to each other in the first direction and the second direction. The light shielding member 70 includes the first light shielding sections 731 and the second light shielding sections 732. The first light shielding sections 731 extend in the first direction. The second light shielding sections 732 extend in the second direction and intersect the first light shielding sections 731. Furthermore, the light guide body 20 includes the third protruding portion 213. The third protruding portion 213 protrudes in the normal direction Dn from the vicinity of the center portion of the first reflecting surface 31, and is in contact with the portion where the first light shielding section 731 and the second light shielding section 732 intersect each other. Accordingly, both the first light shielding section 731 and the second light shielding section 732 are supported, so that the first light shielding section 731 and the second light shielding section 732 are less likely to be sagged.

Other Embodiments

The present disclosure is not limited to the above-described embodiments, and the above-described embodiments can be appropriately modified. In each of the above-described embodiments, individual elements or features of a particular embodiment are not necessarily essential unless it is specifically stated that the elements or the features are essential, or unless the elements or the features are obviously essential in principle.

In the above-described embodiments, each of the prisms 40 has the triangular prism shape. However, the shape of the prisms 40 is not limited to the triangular prism shape, and may also be, for example, a trapezoidal prism shape.

In the above-described embodiments, the light shielding layers 60 are formed of the light absorption films. However, the light shielding layers 60 may also be formed of other material such as light diffusion members and retroreflecting members.

In the above-described embodiments, the second reflecting surface 32 is parallel to the first reflecting surfaces 31. However, the second reflecting surface 32 may also be configured so as not to be parallel to the first reflecting surfaces 31 in accordance with the distance from the optical member 10 to the viewer.

The above-described embodiments may be combined as appropriate.

What is claimed is:

1. An optical member comprising:
   a light guide body including
      an incident surface on which a light from a blind area is incident,
      a first reflecting surface configured to reflect the light guided from the incident surface,
      a second reflecting surface configured to reflect the light reflected by the first reflecting surface,
      a plurality of prisms protruding from the first reflecting surface in a normal direction of the first reflecting surface, arranged at an interval, and configured to emit the light guided from the incident surface and the light reflected by the second reflecting surface to an outside of the light guide body, and a protruding portion protruding from the first reflecting surface in the normal direction; and a light shielding member being in contact with the protruding portion to provide a space between the light shielding member and the first reflecting surface and covering the first reflecting surface to block a light incident toward the first reflecting surface from the outside of the light guide body.

2. The optical member according to claim 1, wherein the light guide body further includes a first rough surface connected with the incident surface, the first reflecting surface, and the second reflecting surface while intersecting each other, and a second rough surface located opposite to the first rough surface and connected with the incident surface, the first reflecting surface, and the second reflecting surface while intersecting each other, the first reflecting surface and the light shielding member extend in a direction from the first rough surface toward the second rough surface, and the protruding portion is in contact with a center portion of the light shielding member in the direction from the first rough surface toward the second rough surface.

3. The optical member according to claim 1, wherein the light guide body further includes a rough surface connected with the incident surface, the first reflecting surface, and the second reflecting surface while intersecting each other, and the protruding portion includes a contact surface being in contact with the light shielding member, and a connection surface connected with the contact surface and the rough surface.

4. The optical member according to claim 3, wherein the connection surface is inclined in such a manner that a length of the protruding portion in the normal direction decreases with increase of a distance from a boundary between the connection surface and the contact surface, and the connection surface is in contact with the light shielding member.

5. The optical member according to claim 1, wherein the light guide body further includes a first rough surface connected with the incident surface, the first reflecting surface, and the second reflecting surface while intersecting each other, and a second rough surface located opposite to the first rough surface and connected with the incident surface, the first reflecting surface, and the second reflecting surface while intersecting each other, each of the plurality of prisms includes an exit surface connected with the first reflecting surface and configured to emit the light guided from the incident surface and the light reflected by the second reflecting surface to the outside of the light guide body, and a non-exit surface connected with the exit surface and the first reflecting surface while intersecting each other, the plurality of prisms include a first prism and a second prism adjacent to the first prism, the light guide body and the light shielding member are configured so as to satisfy a relational expression (1), $$Ws \leq \sqrt{Hp^2 + Wp^2} \tag{1-2}$$

where Hp denotes a distance from a first boundary between the exit surface of the first prism and the first reflecting surface to a second boundary between the exit surface and the non-exit surface of the second prism in the normal direction, Wp denotes a distance from the first boundary to the second boundary in a direction orthogonal to the normal direction and a direction from the first rough surface toward the second rough surface, and Ws denotes a length of a surface of the light shielding member extending in the direction orthogonal to the normal direction and the direction from the first rough surface toward the second rough surface.

6. The optical member according to claim 1, further comprising a plurality of light shielding layers respectively covering the plurality of prisms at least partially, wherein the plurality of prisms is arranged in a first direction that intersects the normal direction, and is arranged in a second direction that intersects the normal direction and the first direction.

7. The optical member according to claim 6, wherein the plurality of prisms is arranged at an interval in the first direction and is arranged at an interval in the second direction, the first reflecting surface is located between any two prisms in the plurality of prisms adjacent to each other in the first direction and the second direction, the light shielding member includes a first light shielding section extending in the first direction, and a second light shielding section extending in the second direction and intersecting the first light shielding section, and the protruding portion is in contact with a portion of the light shielding member at which the first light shielding section and the second light shielding section intersect each other.

* * * * *